US010248497B2

(12) United States Patent
Nair et al.

(10) Patent No.: US 10,248,497 B2
(45) Date of Patent: Apr. 2, 2019

(54) ERROR DETECTION AND CORRECTION UTILIZING LOCALLY STORED PARITY INFORMATION

(71) Applicant: Advanced Micro Devices, Inc., Sunnyvale, CA (US)

(72) Inventors: Prashant Jayaprakash Nair, Atlanta, GA (US); David A. Roberts, Santa Cruz, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 139 days.

(21) Appl. No.: 14/521,183

(22) Filed: Oct. 22, 2014

(65) Prior Publication Data

US 2016/0117221 A1 Apr. 28, 2016

(51) Int. Cl.
*G06F 11/10* (2006.01)
*H03M 13/11* (2006.01)

(52) U.S. Cl.
CPC ........ *G06F 11/1004* (2013.01); *G06F 11/108* (2013.01)

(58) Field of Classification Search
CPC ............ G06F 11/1076; G06F 11/1004; G06F 11/1008; G06F 11/1016; G06F 11/1044; G06F 12/0802; G06F 21/64; G06F 21/71; G06F 12/0811; G06F 15/8069; G06F 2211/1009; G11C 29/00; G11C 5/04; G11C 8/12; G11C 2029/0411; G11C 29/52; H03M 13/09; H03M 13/2918; Y02B 60/1225; G11B 20/18
See application file for complete search history.

(56) References Cited

U.S. PATENT DOCUMENTS

| | | | | |
|---|---|---|---|---|
| 5,912,906 A | * | 6/1999 | Wu | G06F 11/1064 714/16 |
| 6,041,430 A | * | 3/2000 | Yamauchi | G06F 11/1012 714/752 |
| 6,687,791 B2 | * | 2/2004 | Morrison | G06F 11/1004 711/130 |
| 7,191,382 B2 | * | 3/2007 | James | G11B 20/1833 714/769 |
| 7,408,381 B1 | * | 8/2008 | Drimer | G06F 17/5054 326/38 |
| 7,409,623 B2 | * | 8/2008 | Baker | G06F 11/1004 714/763 |

(Continued)

OTHER PUBLICATIONS

Ching-Che Chung et al., "Partial Parity Cache and Data Cache Management Method to Improve the Performance of an SSD-Based RAID", Very Large Scale Integration (VLSI) Systems, IEEE Transactions on, Aug. 15, 2013, 11 pages.

(Continued)

*Primary Examiner* — Phung M Chung

(57) ABSTRACT

A processing system includes a memory coupled to a processor. The memory stores data blocks, with each data block having a separate associated checksum value stored along with the data block in the memory. The processor has a storage location that stores parity information for the data blocks, with the parity information having a plurality of parity blocks. Each parity block represents a parity of a corresponding set of data blocks. The parity blocks can be accessed for use in error detection and correction schemes used by the processing system.

14 Claims, 4 Drawing Sheets

(56) References Cited

U.S. PATENT DOCUMENTS

| | | | | |
|---|---|---|---|---|
| 7,539,926 | B1* | 5/2009 | Lesea | G06F 11/1004 714/758 |
| 8,316,280 | B2* | 11/2012 | Chang | G06F 11/1012 714/763 |
| 8,365,015 | B1* | 1/2013 | Yu | G06F 9/3863 714/16 |
| 9,250,995 | B2* | 2/2016 | Ellis | G06F 11/1016 |
| 2010/0241930 | A1* | 9/2010 | Chang | G06F 11/1012 714/769 |
| 2013/0275832 | A1* | 10/2013 | D'Abreu | G06F 11/1012 714/764 |
| 2014/0208156 | A1* | 7/2014 | Muralimanohar | G11C 8/12 714/6.24 |
| 2014/0223098 | A1* | 8/2014 | Lee | G06F 9/5016 711/118 |
| 2014/0359395 | A1* | 12/2014 | Ellis | G06F 11/1016 714/763 |
| 2015/0089328 | A1* | 3/2015 | Lee | G06F 11/1092 714/770 |

OTHER PUBLICATIONS

Timothy J. Dell, "A White Paper on the Benefits of Chipkill-Correct ECC for PC Server Main Memory", IBM Microelectronics Division, Nov. 19, 1997, 24 pages.

Xun Jian et al., "Reliability Models for Double Chipkill Detect/Correct Memory Systems", 2013 IEEE 19th Pacific Rim International Symposium on Dependable Computing (PRDC), Dec. 2, 2013, 6 pages.

Prashat J. Nair et al., 37 ArchShield: Architectural Framework for Assisting DRAM Scaling by Tolerating High Error Rates, ISCA '13 Proceedings of the 40th Annual International Symposium on Computer Architecture, Jun. 3, 2013, 12 pages.

Jaewoong Sim et al., "Resilient Die-stacked DRAM Caches", ISCA '13 Proceedings of the 40th Annual International Symposium on Computer Architecture, Jun. 3, 2013, 12 pages.

Vilas Sridharan et al., "A Field Study of DRAM Errors", SC '12 Proceedings of the International Conference on High Performance Computing, Networking, Storage and Analysis, Nov. 10, 2012, 6 pages.

Aniruddha N. Udipi et al., "LOT-ECC: LOcalized and Tiered Reliability Mechanisms for Commodity Memory Systems", ISCA '12 Proceedings of the 39th Annual International Symposium on Computer Architecture, Sep. 5, 2012, 12 pages.

Doe Hyun Yoon et al., "Virtualized and Flexible ECC for Main Memory", ASPLOS '10, Mar. 13, 2010, 12 pages.

* cited by examiner

ERROR DETECTION AND CORRECTION UTILIZING LOCALLY STORED PARITY INFORMATION

GOVERNMENT LICENSE RIGHTS

This invention was made with Government support under Prime Contract Number DE-AC52-07NA27344, Subcontract Number B600716 awarded by the Department of Energy (DOE). The Government has certain rights in this invention.

BACKGROUND

Field of the Disclosure

The present disclosure relates generally to error detection and correction schemes in processing systems and, more particularly, to error detection and correction schemes for data stored in off-chip memory.

Description of the Related Art

Error detection and correction schemes are utilized in processing systems to detect errors that may occur during the transmission of data. Error detection schemes employ a variety of techniques to ensure data reliability including error-correcting code (ECC) and checksum schemes employing cyclic redundancy checks (CRCs) and parity bits. CRC values are implemented to detect a possible error that has occurred in data accessed from off-chip memory (that is, memory external to the processor), while using parity information accessed from the off-chip memory to correct the detected error. Once corrected, the corrected data value may be written back to the off-chip memory.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
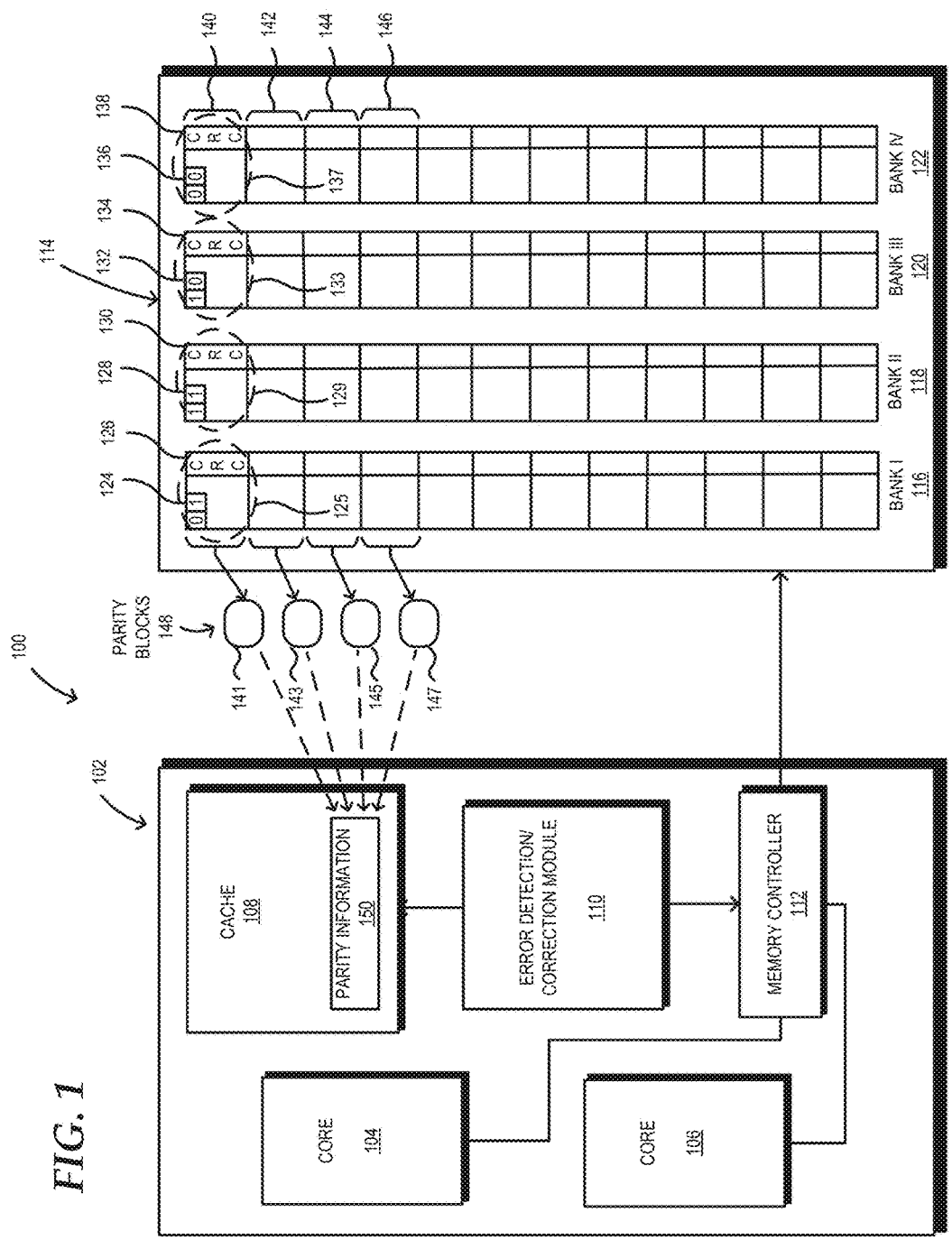
FIG. 1 illustrates a processing system implementing an error detection and correction scheme using locally-stored parity information in accordance with some embodiments.

FIGS. 1-4 illustrate various embodiments of a processing system employing an error detection and correction scheme that utilizes locally-stored parity information (that is, parity information stored with the processor, or "on-chip") to efficiently detect and correct errors in a memory located external to the processor, such as system memory. Such a memory is referred to herein as "external memory" or "off-chip memory." The error detection and correction scheme relies on checksums, such as cyclical redundancy check (CRC) values or other error detection mechanisms, to detect an error in data stored in the off-chip memory, and check bits or parity blocks to correct the error in the data. In some embodiments, the external memory is logically divided into relatively large data block sets. Each data block set has multiple individual data blocks, with each data block set being accorded a single corresponding parity block that covers all data blocks of the data block set, while each data block of the data block set retains a separate checksum value. Note that logical data block sets may be distributed across multiple physical data block sets or banks These parity blocks are stored together as parity information at a location local to the processor, or on-chip with the processor, such as at a designated area of a cache of the processor or other internal memory utilized for this purpose. As the size of the data block set dictates the number of data blocks present in the memory, and thus the number of parity blocks that are stored in the chip location, the size of the data block sets, and thus the number of data block sets for a given memory size, can be selected so as to achieve a suitable balance between on-chip storage requirements for the parity information and robustness in the error detection and correction scheme. In contrast, the checksum information would typically continue to be maintained in the external memory with the corresponding data blocks, but could also reside on-chip.

Under this approach, when data is accessed from the external memory, the CRC value associated with the data is also accessed from the external memory and used to identify whether the data contains an error. In the event an error is detected, the parity block for the data block set containing the data at issue is accessed from the on-chip storage location, along with all other blocks in the data block set (which may be cached), and the parity block is used to correct the error in the data. Additionally, whenever data is written to the cache, the parity block associated with the data block set is updated based on the value of the written data.

Traditionally, a parity block for each data block set would be stored in the external memory along with the CRC value for each block in the set. However, with each data modification operation that occurs, the updated or recalculated parity block for the data block set containing the modified data also must be stored back in memory. By implementing local storage of the parity information, the overhead of writing the revised parity block back to memory can be avoided, thereby increasing the efficiency of the processing system. Further, by interleaving parity more sparsely across multiple data blocks, the parity overhead for on-chip storage can be reduced to meet the requirements of the application.

FIG. 1 illustrates a processing system 100 implementing a local parity storage scheme for error detection and correction in accordance with some embodiments. The processing system 100 implements a processor 102 comprising processor cores 104 and 106, a cache 108, an error detection and correction module 110, and a memory controller 112. The processor cores 104 and 106 may comprise, for example, central processing unit (CPU) cores, graphics processing units (GPU) cores, digital signal processor (DSP) cores, and the like. The cache 108 may comprise one or more caches of a multilevel cache hierarchy. For purposes of the following example, the cache 108 is described in an example context as the last-level cache, such as the L3 cache in a three-level cache hierarchy, the L2 cache in a two-level cache hierarchy, etc.

The processing system 100 also implements a memory 114 external to the processor 102. In one embodiment, the processor 102 is implemented on one or more dice, or "chips," and the memory 114 is external to the processor 102 in that the memory 114 is implemented on one or more chips separate from the one or more chips used to implement the processor 102. For the following description, the term "on-chip" refers to implementation on the one or more chips implementing the processor 102 and, conversely, "off-chip" or "external" refers to implementation external to the one or more chips implementing the processor 102. Thus, because the memory 114 is external to the processor 102, the memory 114 also is referred to herein as "external memory 114" or "off-chip memory 114".

In the depicted example, the memory 114 comprises multiple banks of memory, such as the four depicted banks represented by bank I, bank II, bank III, and bank IV, herein referred to as banks 116, 118, 120, and 122. Each bank of memory is comprised of blocks of data, with the blocks referring to any logical organization of sets of one or more storage locations (e.g., bit cells) of the memory 114 including, but not limited to, a single row of the memory, one or more rows of memory grouped together (e.g., the same row across multiple banks), a cacheline or set of cachelines, etc. For ease of description, the data blocks described below will refer to a single row of data of one of the banks 116, 118, 120, and 122 but during implementation may be comprised of varying organizations of subsets of memory. Each data block of the memory 114 has its own associated error detecting code such as a cyclic redundancy check (CRC) value. Together, the data block and the CRC value are referred to herein as a "memory location." For example, bank 116 has a data block 124 with a CRC value 126 that together are referred to as memory location 125, bank 118 has a data block 128 with a CRC value 130 referred to as memory location 129, bank 120 has a data block 132 with a CRC value 134 referred to as memory location 133, and bank 122 has a data block 136 with a CRC value 138 referred to as memory location 137.

The memory 114 is grouped into sets referred to as "data block sets," with each data block set comprised of a set of one or more individual data blocks and their associated CRC values. As described above, the data blocks comprising the data block sets can be any variety of physical organizations of data. In the following example, the data block sets are comprised of individual rows of data of the data banks 116, 118, 120, and 122 that have been grouped together. For example, a data block set 140 is comprised of memory location 125, memory location 129, memory location 133, and memory location 137. Each set of memory locations, illustrated by data block sets 140, 142, 144, and 146, is similarly grouped among the memory locations of the banks of memory of the memory 114. Each data block set is associated with a parity block that represents a plurality of data blocks in a data block set 148. The plurality of parity blocks 148 is stored in the cache 108 of the processor 102 in a designated parity information storage location 150.

Each data block is grouped into a data block set in order to have relatively larger groupings of data associated with an individual parity block, as opposed to an individual parity block being associated with a single data block, and thereby reduce the storage overhead for parity so that it can remain on-chip, reducing off-chip updates to parity whenever a data value is modified. Traditionally, when a data value, such as a data block, is modified, the parity block associated with that data value must be recalculated and written back into memory. With the volume of data modifications taking place within a processing system, this would create a large volume of parity blocks being written back into memory and thus create less efficient system performance. Thus, grouping the data blocks into data block sets allows for the parity blocks to be stored on-chip, or implemented on the one or more chips implementing a processor 102, since each data block set is associated with a single parity block and therefore less parity blocks must be stored, and thus require storage space, on-chip. By storing the parity blocks on-chip, the parity block can be stored locally and be modified locally without needing to be written back to the memory 114.

As illustrated, data block set 140 is associated with a parity block 141, data block set 142 is associated with a parity block 143, data block set 144 is associated with a parity block 145, and data block set 146 is associated with a parity block 147. Each of these parity blocks 141, 143, 145, and 147 represents the parity values for each memory location that is grouped into a data block set. Note, while a limited number of data block sets are illustrated in FIG. 1, for each memory location of the memory 114 a data block set may be formed by grouping various combinations of memory locations of the data banks Each data block set formed is likewise assigned a calculated parity block to be stored in the parity information storage location 150 of the processor 102 for error detection and correction purposes.

Each parity block associated with each data block set represents the parity block calculated for the data blocks of the entire data block set that is utilized to detect and correct data errors. To illustrate, in at least one embodiment, each parity block of the plurality of parity blocks 148 comprises a set of parity bits, each parity bit representing a parity calculated for a corresponding bit position of the data blocks. To illustrate, bit 0 of parity block 141 may represent the result of an XOR calculation using the bit values at bit position 0 of each of data blocks 124, 128, 132, and 136, while bit 1 of parity block 141 may represent the result of an XOR calculation using the bit values at bit position 1 of each of data blocks 124, 128, 132, and 136, and so on.

When data is transmitted, errors may occur that can affect the validity of the data. In order to determine if an error has occurred, the error detection and correction module 110 will utilize the CRC value of each memory location to detect the error and determine the location of the error. In response to detecting an error by the CRC value, the parity block associated with the data block set containing the error is accessed from the parity information storage location 150 by the error detection and correction module 110 in order to correct the data error. Once the correction has been performed, the error detection and correction module 110 transmits the corrected data value to the memory controller 112 that will write the corrected data value back to the appropriate location in the memory 114. The on-chip parity information may itself have fault protection, e.g. an additional ECC code.

Figure 2:
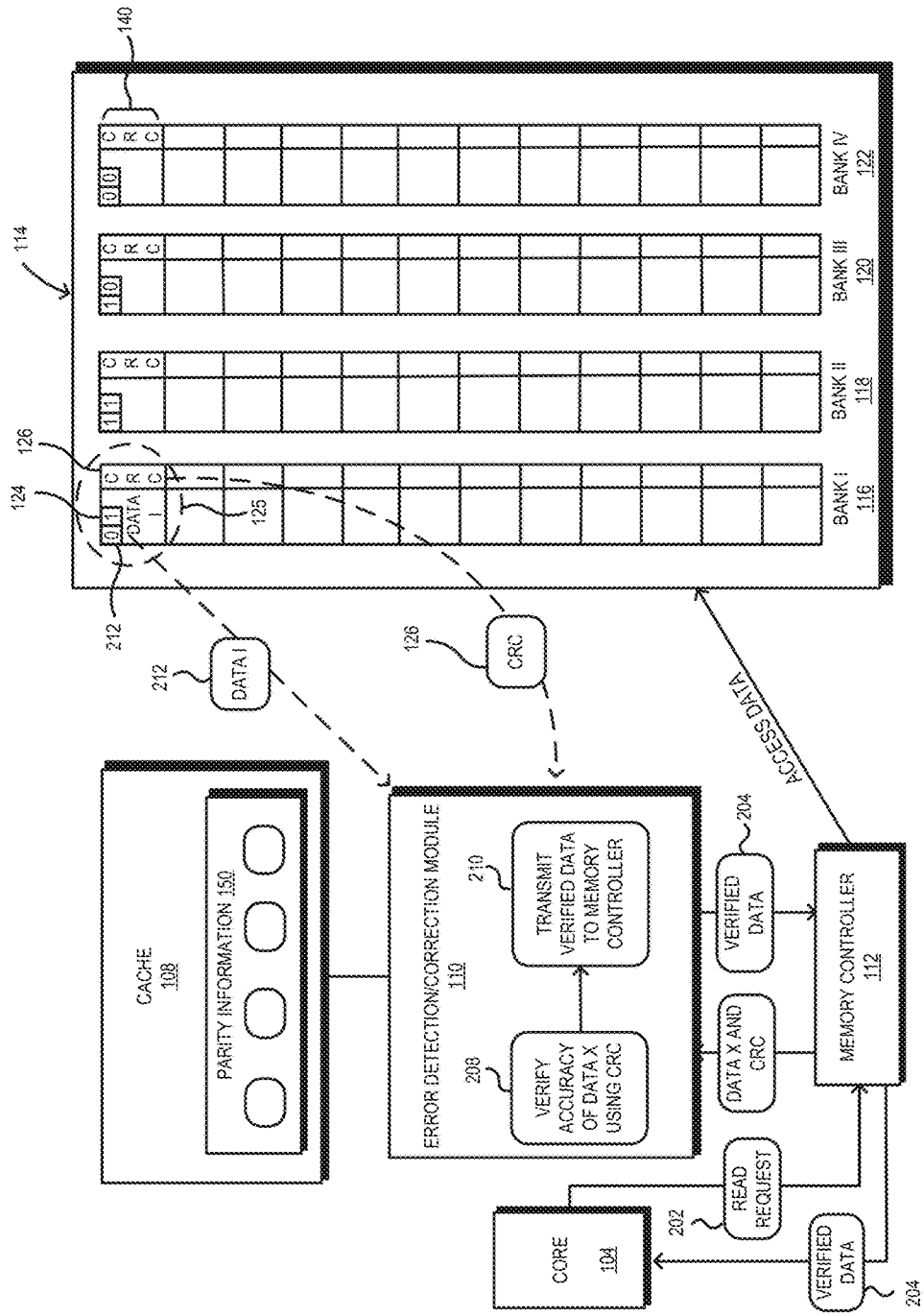
FIG. 2 illustrates a read memory access operation for the processing system of FIG. 1 in accordance with some embodiments.
Figure 3:
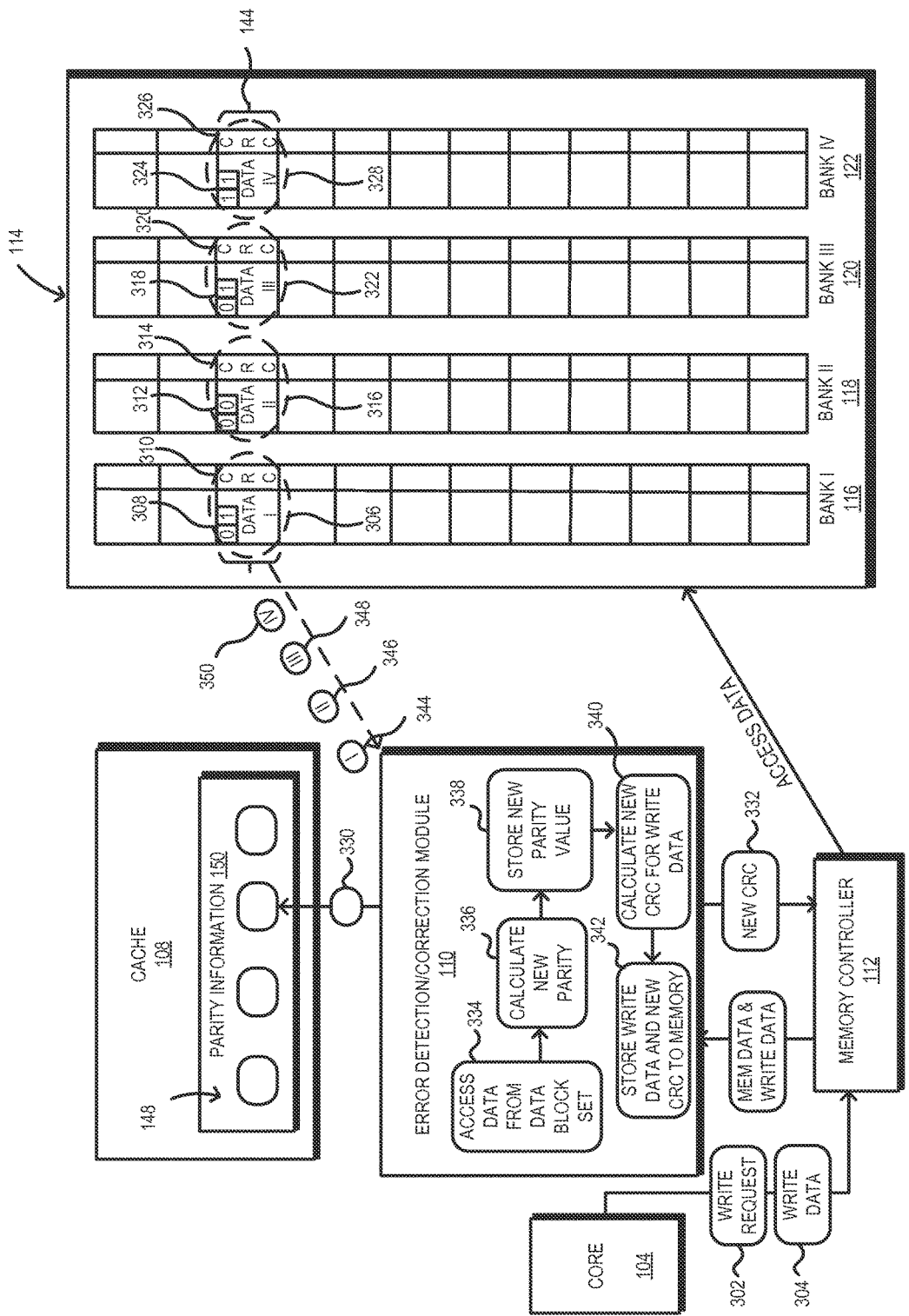
FIG. 3 illustrates a write memory access operation for the processing system of FIG. 1 in accordance with some embodiments.
Figure 4:
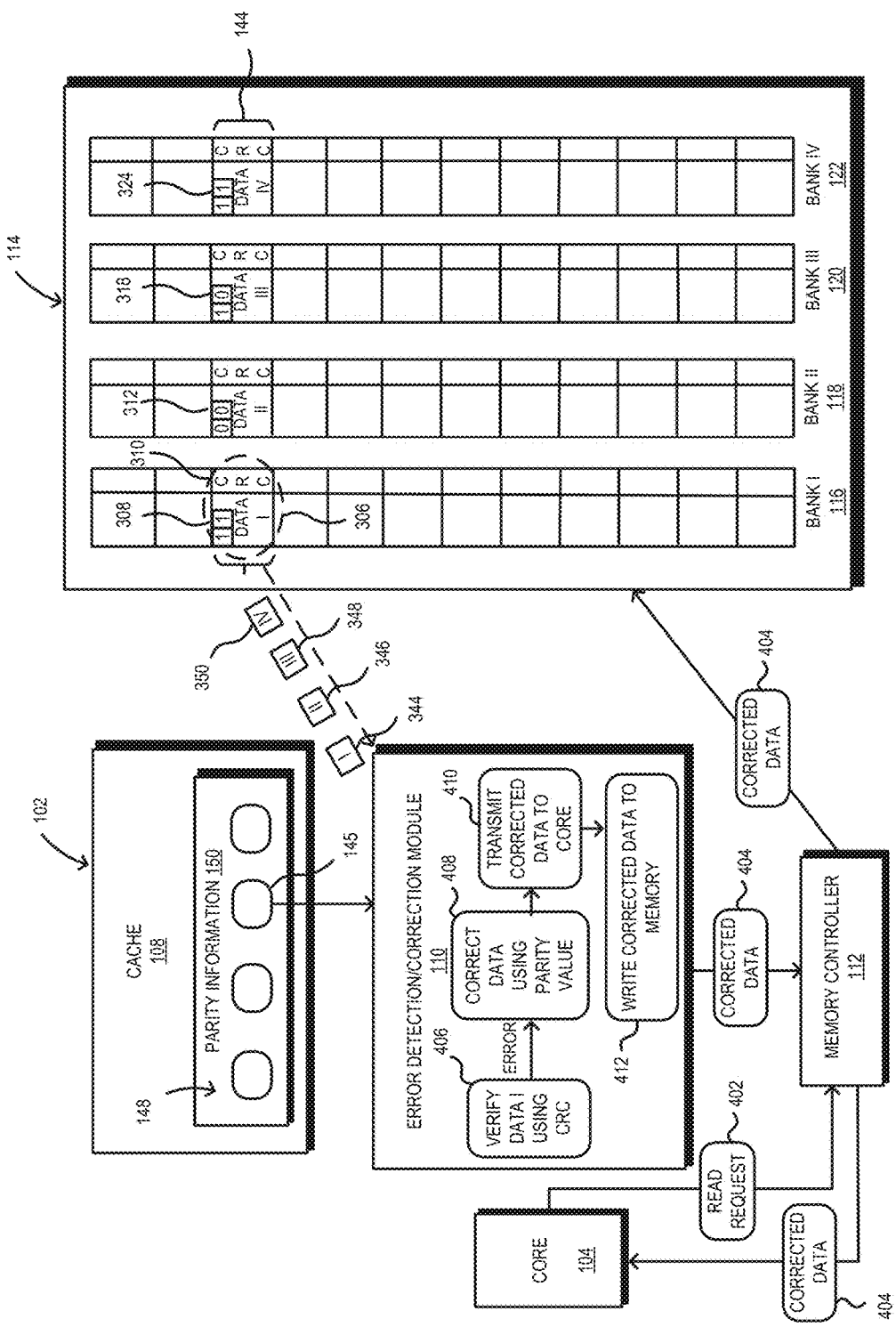
FIG. 4 illustrates an error detection and correction process during a memory access by the processing system of FIG. 1 in accordance with some embodiments.

FIGS. 2-4 illustrate examples of read, write, and correct operations implemented in the error detection and correction scheme utilized to detect and correct errors in external memory locations that are implemented external to the one or more chips implementing the processor 102, such as the memory 114, of the processing system 100. FIG. 2 illustrates a read memory access operation for the processing system 100 of FIG. 1 in accordance with some embodiments. As described above, the cache 108 contains a plurality of parity blocks 148 stored in a designated parity information storage location 150 of the cache 108 and the memory 114 comprises multiple banks of memory, specifically banks I-IV referred to herein as bank 116, bank 118, bank 120, and bank 122. Each bank of memory contains many individual blocks of data that are comprised of any logical ordering of data, such as rows or cachelines. For ease of illustration, banks 116, 118, 120, and 122 are depicted as having rows of data, referred to herein as data blocks, with each data block having an associated cyclic redundancy check (CRC) value.

The CRC value remains with each block of data in the memory 114 during the read memory access operation but is accessed by the memory controller 112.

During the read operation, core 104 sends a read request 202 to memory controller 112 for data stored at a memory location of memory 114. When the read request 202 is sent to the memory controller 112 from core 104, the memory controller 112 accesses the data of the memory location associated with the read request address. For example, the data I 212 of memory location 125, along with the CRC value 126 for data I 212, is shown in FIG. 2 being accessed by the memory controller 112. For ease of illustration, data 212 is shown being transmitted directly to the error detection and correction module 110 but during implementation would be transmitted to the memory controller 112, with the memory controller 112 in turn transmitting data I 212 and its CRC value 126 to the error detection and correction module 110 for evaluation.

After data I 212 and CRC value 126 from memory location 125 are transmitted to the error detection and correction module 110, at operation block 208 data I 212 is verified for accuracy using the CRC value 126. The CRC value 126 is used to detect any errors, along with the location of the error, which may have occurred during transmission of the data in processing system operations. In the depicted example, the data is verified as accurate and no errors have been detected. Since no errors are detected, no correction scheme is required and at operation block 210 the verified data 204 is transmitted to the memory controller 112, which in turn transmits the verified data 204 back to the core 104.

Turning to FIG. 3, a write memory access operation for the processing system of FIG. 1 is illustrated in accordance with some embodiments. FIG. 3 illustrates the processing system of FIG. 1 during a write request in which the core 104 sends a write request 302, along with write data 304 (or modified data), to the memory controller 112 to replace the data of a particular memory location. In this particular example, the data of memory location 306 is being accessed and modified by core 104.

As previously discussed, each data bank 116, 118, 120, and 122 is comprised of individual blocks of data, with the data blocks comprised of any logical ordering of data. The data blocks may be rows of data, cachelines of data, multiple cachelines of data, etc. In the depicted embodiment, the data blocks, in particular data block 308, are comprised of individual rows of data. Various data block sets are formed by grouping data blocks from among the banks 116, 118, 120, and 122 of memory 114, with each data block set having an overall parity, representing a parity block, associated with the data block set. The parity blocks for each data block set together form a plurality of parity blocks 148 stored in the designated parity information storage location 150 of the cache 108. Each overall parity block for the corresponding data block set is determined by calculating the parity values for each parity bit position across all the data blocks contained in the data block set. With a single parity block associated with a potentially large data block set, the plurality of parity blocks 148 for all of the data block sets of memory 114 is able to be stored on-chip. Upon modification of the parity block, the new parity block is stored locally in the cache 108 and writing the parity block back to memory is not required.

For example, as shown in FIG. 3, data block set 144 is comprised of data block 308 and its respective CRC value 310 of bank 116 (or memory location 306), data block 312 and its respective CRC value 314 of bank 118 (or memory location 316), data block 318 and its respective CRC value 320 of bank 120 (or memory location 322), and data block 324 and its respective CRC value 326 of bank 122 (or memory location 328). Thus, when the parity block for data block set 144 is calculated, the parity information is calculated from all of the data blocks 308, 312, 318, and 324 and is used to calculate the overall parity block value for the data block set 144. The overall parity block for data block set 144 is then stored locally, or on-chip, in the designated parity information storage location 150 of the cache 108 and can be accessed and modified locally during any write operations of the processor.

As shown in FIG. 3, the core 104 has sent a write request 302 and write data 304 to the memory controller 112. In response to receiving the write request 302, at operation block 334 the memory controller accesses the data of the addressed data block of data block set 144, replacing the appropriate data block of the data block set 144 with the write data 304. At operation block 334, before writing the data block 308, the old value of the data being overwritten is retrieved from the memory 114 into the error detection and correction module 110. In addition, the parity block associated with the data block set 144 is retrieved from the parity information 150. The old and newly written data values and original parity block are used to generate the new parity block 330 at operation block 336, which is then stored back into the parity information 150. Note, while the memory controller 112 accesses the data of data block set 144 and in turn transmits that information to the error detection and correction module 110, for ease of illustration the data of data block set 144 is being shown as transmitted directly to the error detection and correction module 110. Thus, during implementation the memory controller will access the data of each data block of data block set 144 and transmit that data to the error detection and correction module 110 along with the write data provided by core 104.

Once the new parity block value 330 has been calculated for data block set 144, at operation block 338 the new parity block 330 is transmitted to the cache 108 to be stored in the parity information storage location 150. The new parity block 330 is transmitted to the cache 108 and will replace the original parity block 145 in the parity information storage location 150. At operation block 340, a new CRC value 332 is then calculated by the error detection and correction module 110 for the new write data 304. Lastly, at operation block 342, the new CRC value 332 is transmitted back to the memory controller 112. The memory controller 112 then writes the new write data 304 along with the new CRC value 332 into memory location 306.

With the parity information being stored on-chip in the cache 108 of the processor 102, the parity information can easily be both accessed and altered as illustrated in FIG. 3. When parity information is stored in the memory 114, external to processor 102, the memory controller 112 not only must access the parity information from the memory 114, but once the parity information has been altered it must write the new parity information back to the memory 114. With new parity information being calculated for each write request, having to access parity information from memory and write the newly calculated parity information back to memory 114 can cause delays in system operations and lead to a less efficient processing system. By storing the parity information either in the cache 108 or in another designated storage location of processor 102, parity information can quickly be accessed by memory controller 112 and new parity information can quickly be stored. This new parity block can then be used to detect and correct errors as shown in FIG. 4, which illustrates the correction operation of the local parity storage scheme for error detection and correction.

FIG. 4 illustrates an error detection and correction process during a memory access by the processing system of FIG. 1 in accordance with some embodiments. As with the read operation illustrated in FIG. 2, the core 104 sends a read request 402 to memory controller 112 for data of a memory location of memory 114. When the read request is sent to the memory controller 112 from core 104, the memory controller 112 accesses the data of the memory location associated with the read request address. In this particular example, the data I, referred to herein as data 344, of memory location 306 is shown being accessed by the memory controller 112. For ease of illustration data 344 is shown being transmitted directly to the error detection and correction module 110 but during implementation would be transmitted to the memory controller 112, with the memory controller 112 in turn transmitting data 344 and its CRC value 310 to the error detection and correction module 110.

After the data 344 and CRC value 310 from memory location 306 are received by the error detection and correction module 110, at operation block 406 the data 344 is verified for accuracy using the CRC value 310. The CRC value 310 is used to detect any errors that may have occurred during transmission of the data taking place during processing system operations. In the depicted example, an error has been found in the data 344. In response to detecting an error in data 344, at operation block 408 the error detection and correction module 110 accesses the parity information for data block set 144 from the parity information storage location 150 of the cache 108. Then, the value of every data block in the corresponding data block set is read, and in combination with the parity block, calculates the corrected value of the erroneous data block. In this case, parity block 145 is accessed from the cache 108. After the correction of data 344 takes place at operation block 408, at operation block 410 the corrected data 404 is sent to the memory controller 112. Upon receiving the corrected data 404, the memory controller 112 in turn sends the corrected data 404 back to core 104. Lastly, at operation block 412, the corrected data 404 is written back to memory location 306 by the memory controller 112.

As previously explained above, the parity block 145 stored in the cache 108 is calculated as an overall parity, comprising a single parity block, for the data block set 144. Each parity block contains parity values that have been calculated for each set of parity bits stored at a particular location within each memory location. For ease of description, the data blocks comprising data block set 144 are represented as individual data rows of banks 116, 118, 120, and 122, but can be comprised of any logical ordering of data, for example a cacheline, during implementation. Thus, when using the parity block 145 to correct the data 344 of memory location 306, each parity block for each data block 308, 312, 318, and 324 of data block set 144 must be accessed in order to determine the parity block for data block 308. Once the parity block for data block 308 is determined, this parity information is used to correct the data 344.

With the parity blocks of the plurality of parity blocks 148 each being associated with a data block set, less storage space is required than if the parity information was associated with an individual block of data. As a result, the plurality of parity blocks 148 can be stored on-chip in the cache 108, or other designated storage location of processor 102. Storing the parity blocks on-chip allows for the parity information to be easily accessed in order to correct memory errors that occur during system operations as illustrated by the operation blocks 406, 408, 410, and 412 of FIG. 4. If the parity information was stored in a memory location external to processor 102, the memory controller 112 would need to access the parity information from memory 114 in order to correct errors that have been detected. This could lead to delays in error correction, and overall system operations, as accessing the parity information from memory is often much slower than accessing information stored locally on the same chip as the memory controller 112.

In some embodiments, the apparatus and techniques described above are implemented in a system comprising one or more integrated circuit (IC) devices (also referred to as integrated circuit packages or microchips), such as the processing device described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    implementing a memory external to a processor, the memory comprising multiple banks of data, each data bank comprising a plurality of data blocks stored at locations in the memory, each data block of the plurality of data blocks including an associated checksum value for error detection;
    storing a plurality of parity blocks for error correction in a cache on the processor, each parity block corresponding to a set of data blocks of the plurality of data blocks;
    accessing a first data block and its associated first checksum value from the set of data blocks;
    detecting an error in the first data block based on the associated first checksum value;
    storing, by the processor, a modified data value to the first data block in the memory;
    determining, at the processor, an updated checksum value for the first data block based on the modified data value;
    storing the updated checksum value to the memory;
    determining, at the processor, an updated parity block for a first set of data blocks that include the first data block based on the modified data value; and
    storing the updated parity block to the cache in the processor.

2. The method of claim 1, further comprising:
    accessing from the cache the first parity block corresponding to the first data block; and
    generating a corrected first data block by correcting the error in the first data block based on the first parity block.

3. The method of claim 2, further comprising:
    storing, by the processor, the corrected first data block to the memory.

4. The method of claim 1, wherein the checksum value is a cyclical redundancy check (CRC) value.

5. The method of claim 1, wherein each data block is a corresponding row of the memory and each set of data blocks comprises rows across multiple banks of the memory.

6. The method of claim 1, wherein each parity block of the plurality of parity blocks comprises a set of parity bits, each parity bit representing a parity calculated for a corresponding bit position of the one or more data blocks in the set of data blocks.

7. A system comprising:
    a processor comprising a cache on the processor for storing a plurality of parity blocks, each parity block corresponding to a set of data blocks;
    a memory external to the processor and comprising multiple banks of data, each data bank comprising a plurality of data blocks stored at locations in the memory, each data block of the plurality of data blocks including an associated checksum value for error detection; and
    an error detection and correction module operative to:
        access a first data block and a first checksum value of the first data block;
        detect an error in the first data block based on the first checksum value;
        access a first parity block for the set of data blocks that includes the first data block;
        correct the error in the first data block based on the first parity block by storing a modified data value to the first data block in the memory;
        determine an updated parity block for a first set of data blocks that includes the first data block based on the modified data value;
        store the updated parity block to the cache;
        determine an updated checksum value for the first data block based on the modified data value;
        store the updated checksum value to the memory;
        determine an updated parity block for a first set of data blocks that include the first data block based on the modified data value; and
        store the updated parity block to the cache.

8. The system of claim 7, wherein the checksum value is a cyclical redundancy check (CRC) value.

9. The system of claim 7, wherein each data block is a corresponding row of the memory and each set of data blocks comprises rows across multiple banks of the memory.

10. The system of claim 7, wherein each parity block of the plurality of parity blocks comprises a set of parity bits, each parity bit representing a parity calculated for a corresponding bit position of the one or more data blocks in the set of data blocks.

11. A non-transitory computer readable medium embodying a set of executable instructions, which when executed by a computer system performs a process comprising:
    accessing a memory external to a processor, the memory comprising multiple banks of data, each data bank comprising a plurality of data blocks stored at locations in the memory, each data block of the plurality of data blocks including a separate checksum value for error detection;
    storing a plurality of parity blocks for error correction in a cache on the processor, each parity block corresponding to a set of data blocks of the plurality of data blocks;

in response to transmitting one or more data blocks from the set of data blocks, determining based on the separate checksum value, whether a data error exists;

in response to determining that the data error exists, accessing, from the cache, the parity block corresponding to the set of data blocks;

correcting the data error by storing a modified data value to a first data block in the memory;

determining an updated checksum value for the first data block based on the modified data value;

storing the updated checksum value to the memory;

determining an updated parity block for a first set of data blocks that include the first data block based on the modified data value;

storing the updated parity block to a storage location of the processor.

12. The non-transitory computer readable medium of claim 11, further comprising:

storing the corrected data block set to the memory.

13. The non-transitory computer readable medium of claim 11, wherein the checksum value is a cyclical redundancy check (CRC) value.

14. The non-transitory computer readable medium of claim 11, wherein each parity block of the plurality of parity blocks comprises a set of parity bits, each parity bit representing a parity calculated for a corresponding bit position of the one or more data blocks in the set of data blocks.

* * * * *